United States Patent
Squires et al.

(10) Patent No.: US 7,412,089 B2
(45) Date of Patent: Aug. 12, 2008

(54) EFFICIENT FINDER PATTERNS AND METHODS FOR APPLICATION TO 2D MACHINE VISION PROBLEMS

(75) Inventors: Sanford R. Squires, Stow, MA (US); James K. Levinger, Concord, MA (US)

(73) Assignee: Nextcode Corporation, Concord, MA (US)

(*) Notice: Subject to any disclaimer, the term of this patent is extended or adjusted under 35 U.S.C. 154(b) by 55 days.

(21) Appl. No.: 11/438,687

(22) Filed: May 23, 2006

(65) Prior Publication Data

US 2006/0269136 A1   Nov. 30, 2006

Related U.S. Application Data

(60) Provisional application No. 60/683,350, filed on May 23, 2005.

(51) Int. Cl.
G06K 9/00 (2006.01)

(52) U.S. Cl. .................. 382/141; 382/103; 382/204

(58) Field of Classification Search ................ 382/103, 382/141, 181, 203, 204
See application file for complete search history.

(56) References Cited

U.S. PATENT DOCUMENTS

| | | | |
|---|---|---|---|
| 4,924,078 A | 5/1990 | Sant'Anselmo | |
| 5,053,609 A | 10/1991 | Priddy et al. | |
| 5,128,526 A | 7/1992 | Yoshida | |
| 5,189,292 A | 2/1993 | Batterman et al. | |
| 5,304,787 A | 4/1994 | Wang | |
| 5,327,510 A | 7/1994 | Morikawa et al. | |
| 5,343,031 A | 8/1994 | Yoshida | |
| 5,541,396 A | 7/1996 | Rentsch | |
| 5,591,956 A | 1/1997 | Longacre et al. | |
| 5,616,905 A | 4/1997 | Sugiyama | |
| 5,686,718 A | 11/1997 | Iwai et al. | |
| 5,726,435 A | 3/1998 | Hara et al. | |
| 5,734,736 A * | 3/1998 | Palmer et al. | 382/103 |
| 5,825,015 A | 10/1998 | Chan | |
| 5,862,267 A | 1/1999 | Liu | |
| 5,866,895 A | 2/1999 | Fukuda et al. | |
| 5,896,403 A | 4/1999 | Nagasaki et al. | |
| 5,959,285 A | 9/1999 | Schuessler | |
| 6,116,507 A | 9/2000 | Fukuda et al. | |
| 6,182,901 B1 | 2/2001 | Hecht et al. | |
| 6,267,296 B1 | 7/2001 | Ooshima et al. | |
| 6,296,192 B1 | 10/2001 | Hecht | |
| 6,302,329 B1 | 10/2001 | Iwai et al. | |

(Continued)

*Primary Examiner*—Gregory M Desire
(74) *Attorney, Agent, or Firm*—Marc S. Kaufman; NixonPeabody, LLP (57) ABSTRACT

The invention relates to a finder pattern for detection and location of at least one target feature in a target object. The finder pattern includes at least two triads arranged in predetermined locations in the target object, wherein each triad includes a first blob, a second blob, and a third blob, wherein each blob has substantially the same area and is positioned in a predetermined location in the target object. The locations of the first and second blobs are substantially equidistant from the third blob, and the locations of the first, second, and third blobs are not collinear. The invention further relates to a method for detecting a finder pattern in a target object, and a computer readable medium having instructions stored therein for detecting a finder pattern in a target object, which, when executed by a processor of a computing device, cause the computing device to carry out the steps of the method.

18 Claims, 4 Drawing Sheets

U.S. PATENT DOCUMENTS

| | | |
|---|---|---|
| 6,533,182 B1 | 3/2003 | Ohshima et al. |
| 6,604,682 B2 | 8/2003 | Wakamiya et al. |
| 6,622,085 B1 * | 9/2003 | Amita et al. ................ 701/208 |
| 6,674,919 B1 | 1/2004 | Ma et al. |
| 6,752,316 B2 | 6/2004 | Mizoguchi |
| 6,758,399 B1 | 7/2004 | Brunelli et al. |
| 6,786,412 B2 | 9/2004 | Shimizu |
| 6,817,539 B2 | 11/2004 | Walmsley et al. |
| 6,839,470 B2 * | 1/2005 | Ikeda ......................... 382/266 |
| 6,863,218 B2 | 3/2005 | Muramatsu et al. |
| 6,869,022 B2 | 3/2005 | Corby |
| 6,999,600 B2 * | 2/2006 | Venetianer et al. .......... 382/103 |
| 7,209,587 B1 * | 4/2007 | Hsu ............................ 382/173 |
| 7,227,893 B1 * | 6/2007 | Srinivasa et al. ........ 375/240.08 |
| 2002/0020746 A1 | 2/2002 | Roustaei |
| 2005/0109852 A1 | 5/2005 | Walmsley et al. |
| 2005/0121520 A1 | 6/2005 | Yamaguchi et al. |
| 2005/0145703 A1 | 7/2005 | Bryborn |
| 2005/0196015 A1 * | 9/2005 | Luo et al. .................... 382/103 |
| 2006/0045311 A1 * | 3/2006 | Shibuya ...................... 382/103 |
| 2006/0103650 A1 * | 5/2006 | Kamiwada et al. .......... 345/427 |
| 2006/0269136 A1 * | 11/2006 | Squires et al. ............... 382/181 |
| 2006/0291695 A1 * | 12/2006 | Lipton et al. ................ 382/103 |
| 2008/0002856 A1 * | 1/2008 | Ma et al. ..................... 382/103 |
| 2008/0049973 A1 * | 2/2008 | Hermosillo Valadez et al. .......................... 382/103 |

* cited by examiner

EFFICIENT FINDER PATTERNS AND METHODS FOR APPLICATION TO 2D MACHINE VISION PROBLEMS

RELATED APPLICATION DATA

This application claims the benefit of U.S. Provisional Patent Application No. 60/683,350, filed on May 23, 2005, which is hereby incorporated by reference for all purposes as if fully set forth herein.

FIELD OF THE INVENTION

The invention relates to the creation and use of finder patterns for efficient detection and coordinate system mapping of target objects. The finder patterns are constructed from a flexible configuration of blob elements having recognizable attributes.

BACKGROUND

Conveniently it is known to use finder patterns to find and identify a wide variety of information on articles and products. Finder patterns are present in most machine readable media, such as common barcodes and two dimensional machine readable codes.

Printed one dimensional barcodes like UPC and Code 39 are well known in the art. They read by electronic sensors scanning along a single line through a printed set of parallel lines of varying width which constitute the code. The information sensed by scanning is passed through logic circuitry which senses the position of codes by detecting starting and stopping positions of code elements along the scan lines and senses timing information to recover size metrics of the code. The characteristics of a code that reveal its position and metrics are commonly referred to as its "finder pattern". Data content of any codes can only be recovered after the position and metrics of the code are known. In the case of one dimensional codes, the finder pattern design is extremely simple, but typically accounts for 10% or more of the total space occupied by a code. Additionally, one dimensional barcodes are very limited in the amount of data they can carry, and have poor data density.

Many two dimensional codes have been invented to meet the need for larger amounts of data and better data density. Such codes are commonly designed to carry data in a regular rectangular array of elements, much like the older human and mechanical codes like Braille, the player piano scroll, and the punch card. To read such codes with electronic sensing devices requires more sophisticated finder pattern designs that the simple types found in one dimensional codes. Various 2D machine readable code formats like Dot Code A (Phillips Dot Code), PDF-417, Data Matrix, Snowflake and QR-Code are examples of 2D machine readable codes. All of these have specific pattern components to help identify the presence, position, and metrics of the data elements of the code.

As part of their evolution from one dimensional codes, many two dimensional codes have finder patterns that anticipate looking for high contrast line edges with a known sequential spacing pattern detected by scanning along a single scan line (e.g.—PDF-417 and QR). They work well in an environment where the target object is at a known orientation relative to the sensor, and where lighting is well controlled. They are most effective when there is no perspective distortion. Perspective distortion is well known and mathematically understood. In the case of two dimensional surfaces, it occurs when the target surface plane is not perfectly perpendicular to the optical axis or line of sight from the sensor. Such distortion causes a number of problems for processing logic used to identify and locate the finder patterns. For example, points that are equidistant on a target are not typically equidistant in an image under perspective distortion. Also, lines that are parallel on a target will generally not appear to be parallel in an image under perspective distortion. Accordingly, additional algorithmic complexity is required to compensate for the perspective distortions. Although the mathematics of perspective has been well understood for centuries, finder patterns for barcodes have not been designed to easily facilitate correction for this distortion.

U.S. Pat. No. 6,267,296 illustrates a QR finder pattern. The QR finder pattern is an example of a conventional finder pattern, which performs poorly when perspective distortion is present. This pattern is found by recognizing the successive length ratios of light and dark elements along a scan line through large nested-squares patterns in each of three primary corners of a QR code. The method is effective to locate the code when the code is oriented in an un-rotated position and/or the plane of the target is perpendicular to the optical axis of the camera. However, if the QR target is rotated, so that laser scan lines are not perfectly aligned with the rectangular edges of the code, (or equivalently, so that a line of image pixels in a digital camera is not perfectly aligned with the rectangular edges of the code in that image), or if the plane of the target is tilted with respect to the optical axis, then the effectiveness of the finder method substantially decreases. Wide tolerances and/or additional scan line searches must be performed to reliably find the code in different orientations. This added complexity and process steps are disadvantageous.

Most conventional finder patterns are effective under good focus conditions, but rapidly degrade in the presence of blur. For example, U.S. Pat. No. 5,053,609 discloses a Data Matrix code finder pattern. The primary finder pattern of this code includes solid straight line edges on two bounding sides of the code. The edge lines, under good focus conditions, may be detected by identifying points of high gradient value on a series of parallel pixel scan lines through an image. After locating these high-gradient feature points, it is necessary to find two significant subsets of these points that fall predominantly in straight lines. The lines formed by these two subsets are interpreted to be the outer edges of two sides of the full Data Matrix code.

Under blur conditions, high image gradients are strongly attenuated and may appear to be displaced, depending on nearby elements. Blur can be modeled as an optical "circle of confusion" which spreads the light which should ideally be focused on a single point in the image over the entire area of the circle. In this way, light or dark neighboring elements with the circle of confusion can contribute to the observed gradient at the center of the circle. Thus, what might be a point of highest gradient (an "edge") in a perfectly focused image may not be the point of highest gradient in a blurred image. Specifically, when the diameter of the circle of confusion equals or exceeds the width of the solid line sides of the Data Matrix code, therefore, the location of the feature points can strongly distorted in a way that is dependent on the brightness of nearby points, especially the varying data elements inside the code. The estimated feature point locations may be significantly distorted and may not appear to be colinear. Other common issues like sensor noise, shadows, and lighting gradients, also affect the feature point location estimates. As a result, feature points may appear to lie on a series of broken line segments with varying orientations, rather than the long straight lines that are the edges of the real-world target. Thus, the long edges may not be recognized, or they may not be recognized for their full length and significant error can be introduced into the estimated location and orientation. Long straight line finder patterns which are common in one dimensional codes do not work very well generally with 2D codes.

Finder patterns for 2D codes almost always include a timing pattern. These secondary parts of the finder pattern assist, e.g., in calibrating the number of data elements and the local unit distance for their spacing in an image of the target. A common conventional timing pattern includes a known pattern of alternating contrast elements along one or more lines at specific positions in the target. Such timing patterns are found in QR, Data Matrix, and Snowflake code.

U.S. Pat. No. 5,825,015 illustrates a Snowflake code pattern. The timing pattern includes a fixed pattern of all dots all along one of the two matrix array diagonals. The pattern is used to determine the size of the Snowflake code and is a primary target of a search strategy to find the code. The diagonal, however, uses a large number of dots otherwise available to convey data, and introduces a visually distinct pattern in what would otherwise be a bland field of dots for a human observer. Additional elements of the Snowflake finder pattern include special two-tiered information carrying structures in each corner of the code. In total, the finder pattern for a Snowflake code occupies about a quarter of the total target object area of the code.

QR code also utilizes vertical and horizontal timing patterns between its corner squares. In the more common smaller capacity QR codes, the finder pattern and other fixed elements of the code may occupy nearly half of the target object code area.

Data Matrix code also utilizes timing patterns. These timing patterns constitute the two remaining sides of the code. They consist of an alternating series of small dark and light elements along the borders of the Data Matrix square opposite from the solid straight lines used as an initial finder pattern. (For large code sizes, Data Matrix also introduces additional solid line patterns and timing patterns on the interior of the code.) After an initial estimate of the position of a Data Matrix code is determined by locating the two solid line edges of the code as described before, it is necessary to locate the location and orientation of both timing pattern lines accurately. This is required because the perspective distortion cannot be determined from knowledge of the location and orientation of only two lines. Four lines (or four points) are required. Determining the location and orientation of lines of alternating light and dark modules, especially under blur and shadow conditions, requires a time consuming computational process that typically has poor error characteristics. Data Matrix thus has a poorly designed finder pattern for use in conditions where perspective, blur, and other distortions are likely. Moreover, the timing patterns require a substantial percentage of the available space, thereby limiting the overall data density of the code.

As shown for the foregoing, finder patterns known in the art have a number of disadvantages. They cope poorly with common problems like perspective and blur, and they typically occupy a significant percentage of the target object code area.

In addition, conventional finder patterns, such as the QR, Data Matrix, and Snowflake patterns, are typically visually distinctive graphical elements. Accordingly, the finder patterns are aesthetically objectionable to graphic artists because they tend to clash with product artwork and/or detract from the overall appearance of product packaging. These finder patterns make it difficult to introduce consumer friendly branding or colorful graphic information, e.g., icons, calling attention to intended use or data content. The visual dominance of finder patterns can detract from and limit the effectiveness of iconic information elsewhere on the target. Clearly, they are not appropriate for other related applications such as assisting in machine recognition of symbols, logos, artwork, and general objects in the real-world.

Artistic graphic packaging elements can cause significant technical problems for a decoder by introducing structures that will confuse finder algorithms. For example an icon with a rectangular border near a Data Matrix code or QR code can introduce edges which may be confused with the correct edges of the code. Accordingly, graphics must usually be placed at a considerable distance from all other elements of the code for the finder and data decoding algorithms to work properly.

Moreover, most existing finder patterns form part, or all, of the overall geometric outline of the two-dimensional (2D) code with which they are associated. Accordingly, the finder patterns must typically occur in specific locations, e.g., outside or protruding from the outside, or at the corners of the code, thereby, introducing limitations in the overall shape of codes and in the range of code sizes that are available or practical.

In additional, the conventional finder patterns typically do not work well on non-linear geometries, e.g., a curved enclosure outline or an outline with concave portions. Such flexibility in the overall shape of the machine readable portion of is desirable to create consumer recognizable and consumer friendly codes.

SUMMARY OF THE INVENTION

Accordingly, the invention is directed to efficient finder patterns and methods for application to two-dimensional (2D) machine vision problems that obviates one or more of the problems due to limitations and disadvantages of the related art.

An advantage of the invention is to provide a small, visually unobtrusive, and computationally efficient finder pattern which is easily located in images of targets containing significant blur, shadow, rotation, perspective distortion, and arbitrary nearby graphic elements.

Another advantage of the invention is to easily allow simple, direct correction of perspective. distortion in images by calculation of a coordinate mapping between the realword target and an image of the target using location information of the finder pattern elements. This obviates the need for secondary timing patterns to determine surface metrics, and results in minimal surface area use for finder pattern elements.

Another advantage of the invention is to provide a single finder pattern strategy which can support simultaneous search for a variety of codes with different target shapes and sizes by using a single finder pattern recognition algorithm with a series of one or more externally maintainable finder pattern specifications.

Additional features and advantages of the invention will be set forth in the description which follows, and in part will be apparent from the description, or may be learned by practice of the invention. The features and other advantages of the invention will be realized and attained by the structure particularly pointed out in the written description and claims hereof as well as the appended drawings.

To achieve these and other advantages and in accordance with the purpose of the present invention, as embodied and broadly described, the invention relates to a finder pattern for detection and location of at least one target feature in a target object. The finder pattern includes at least two triads arranged in predetermined locations in the target object, wherein each triad includes a first blob, a second blob, and a third blob, wherein each blob has substantially the same area and is positioned in a predetermined location in the target object. The locations of the first and second blobs are substantially equidistant from the third blob, and the locations of the first, second, and third blobs are not collinear.

In addition, the finder pattern may include at least one solo arranged in a predetermined location in the target object, wherein each solo includes a single blob having a predetermined location in the target object relative to the triads. Also, at least two of the triads may be linked with a linking vector, and at least one of the triads and at least one solo may be linked with a linking vector. It is also preferred that the first, second, and third blobs have substantially the same shape, and each blob may be geometrically shaped.

Furthermore, the target object preferably has at least one detectable characteristic, for example, a machine readable code, a color pattern, a radiation pattern, one or more raised surface elements, one or more holes, and the like. Also, the target feature may include graphical elements, detectable visual characteristics, machine readable code including data, and the like. In addition, the finder pattern may be arranged on a two-dimensional planar surface or a curved surface, and the triad and solo locations may form corner positions of a L-type shape, a triangle-type shape, a regular polygon-type shape, a irregular polygon-type shape, an oval-type shape, and the like.

The invention also relates to a finder pattern for detection and location of target features in a target object, the finder pattern including at least two triads arranged in predetermined locations in the target object, wherein the triads are linked with a linking vector. In this embodiment, the finder pattern may also include at least one solo arranged in a predetermined location in the target object, wherein the at least one solo includes a single blob having a center, and at least two of the triads and at least one solo may be linked with one or more linking vectors. Furthermore, each of the triads may include a first blob, a second blob, and a third blob having substantially the same area, the locations of the first and second blobs may be substantially equidistant from the location of the third blob, and the locations of the first, second, and third blobs are not collinear.

The invention further relates to a method for detecting a finder pattern in a target object. The method includes the steps of processing an image of a target object, identifying six or more blobs in the image, identifying two or more potential triads in the image using the six or more identified blobs, determining information about the characteristics of the two or more potential triads, and determining whether the information about the characteristics of two or more of the potential triads corresponds to information about one or more characteristics of two or more target triads in a finder pattern specification, wherein the finder pattern specification includes information about the characteristics of the two or more target triads In addition, the information about the characteristics of the two or more target triads in the finder pattern specification may include at least one of positional information about the target triads and information about the visual characteristics of the target triads, and the information about the characteristics of the two or more potential triads in the finder pattern specification may include at least one of positional information about the potential triads and information about the visual characteristics of the potential triads.

The method may further include the step of sensing the target object prior to the step of processing the image, wherein the step of sensing comprises reading the target object with a sensor. The sensor may be selected from the group consisting of a scanner, a camera, and a range finder. In addition, the method may include steps of generating a list of attributes of at least one of the potential triads by performing at least one of a binarization technique, a flat fielding technique, a creation of contour boundaries technique, or an edge detection and linking of edge boundaries around blobs technique, reducing the image noise with a noise reduction filter prior to the step of identifying the six or more blobs in the image, and eliminating blobs having one or more attributes that do not meet a predetermined criterion prior to the step of identifying the two or more potential triads. Furthermore, the method may include the step of processing the finder pattern specification using a computing device prior to the step of determining whether the information about the characteristics of two or more of the potential triads corresponds to information about one or more characteristics of two or more target triads in the finder pattern specification.

The method described above may also be embodied in a computer readable medium having instructions stored therein for detecting a finder pattern in a target object, which, when executed by a processor of a computing device, will cause the computing device to carry out the method. In addition to traditional computing devices, computing devices as it is used herein include portable devices, such as cellular phones and PDA's, and the instructions may be stored within the devices on internal storage media, including, for example, ROM and RAM, as well as any suitable external storage devices.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

In a typical application of this invention, an image is captured by a camera device of some two dimensional (planar or near-planar) object. In the preferred embodiment, a camera is an ordinary optical sensor device that produces an array of digital information in the memory of some computational device. It should be obvious that any sensing device capable of producing a two dimensional image, such as a range sensor, short range radar, document scanner or other apparatus can also be a suitable "camera".

A target object may be something as simple as a pattern of information printed in black ink on white paper (like the machine readable codes discussed earlier) that is sensed via ambient light by the camera. Alternatively it may be a complex pattern of colors or variations in the target surface such as a texture or deliberate deformations like Braille illuminated by light, sound, or other form of radiation from a specialized source with specific characteristics. It is also possible that the surface of the target may be designed to emit its own pattern of radiation like a television screen or a computer screen.

The elements of the "array of digital information" captured by the camera are commonly called pixels. Pixels may themselves be simple integers (e.g.—for grayscale, binary, or range images) or may be a multidimensional vector (e.g.—for RGB or YUV image formats).

In a preferred embodiment of this invention, the target consists of a pattern of areas of the target (called "blobs") having distinctive properties that can be appropriately sensed by the sensor and produce corresponding areas in an image which can be identified as an area of local extrema of some scalar function of local image pixels. For example, if the area patterns consist of black ink markings on a white paper background, and the image is an ordinary grayscale image, the corresponding area in the target would be an area of local minimum of grayscale pixel values. The "scalar function" in this case is simply the grayscale pixel value. And it should be obvious that the invention applies equally to reversal of the black and white colors by simply using an alternative function that does something mathematically simple like multiply the original function by negative one.

If sensor noise is significant, an image might be smoothed by a simple linear filter, in which case the "scalar function" would be a mathematical function of all pixels within a neighborhood of a given pixel position. A more complex example would be an RGB style image with noise, where it might be appropriate to have the scalar function create a weighted sum of the R, G, and B values of each pixel, combined with a smoothing filter summation of local pixel RGB sums, thus creating a smoothed estimate of a local grayscale value.

More generally, it is obvious that the function of local pixel values allows for recognizing specific colors and contrasting colors, while possibly ignoring some other colors. It also allows for detecting blob areas based on detecting local gradient patterns in specific directions, or matching texture patterns.

In identifying blobs, it is anticipated that some tolerance is allowed for function value variation due to noise. A blob area is simply defined as a contiguous region of the image where a selected scalar function value is within a selected allowed range of difference from one or more occurrences of the extreme value occurring with the area.

As the term "blob" implies, it is not important to the core concepts and working of this invention exactly what shape the pattern areas in the target are. Instead, any suitable shape or design may be used. For example, circles, rectangles, squares, ellipses, pentagons, stars, or any other compact shape may be used as blobs. In addition, it is easy to see that blobs can also be icons, branded shapes, or even irregularly shaped.

Blobs preferably have distinctive characteristics upon which suitable blobs may be chosen. For example, the location and general size of a blob in the ideal reference target should be known in some selected 2D frame of reference on the target. The pixel group in an image corresponding to the blob should be readily detected and it's location should be able to be calculated (in pixel or sub-pixel coordinates). Also, the area or size of a blob in the image should be capable of being approximately determined and generally proportional to its area in the target.

To be useful, finder patterns should identify specific locations in the image with as much accuracy as possible. Typically, an estimate of the centroid of all pixels in an image associated with a blob can be used as an estimate of its location. Using a location estimate based on the edge boundary locations of the pixel group is possible and may be very computationally efficient in some circumstances, but could lead to significant error under conditions such as blur and perspective distortion. If local smoothing functions are used to identify blobs, the location might alternatively be defined by finding the location of a local extrema of the smoothing function.

Blobs are common in some natural scenes and are also inadvertently present in some artificial scenes. For images of natural scenes, blobs can be caused by small objects, surface imperfections, texture patterns, specular reflection, sensor noise, and other conditions. It is an object of this invention to use blobs to construct finder patterns in such a way that the intentionally significant blobs placed in a target as part of a finder pattern can be readily distinguished from the incidental blobs that are part of background, noise, or blobs that may correspond to data elements. To make explanations clear in describing this invention, the concepts of a "solo" and a "triad" are explained in more detail below.

A triad is a grouping of exactly three blobs on the target having the following characteristics in a preferred embodiment. Two of the blobs (the "arms") in the triad should be placed on the target with their centers an equal distance, D, from the third blob (the "root"). Preferably, all three of the blobs in a triad have approximately the same area. In addition, the centers of the three blobs should not be not colinear. Also, no centers of any blobs other than the root or arms are within a parallelogram shaped forbidden zone centered on the root, with the arms at the midpoints of two adjacent sides of said parallelogram, but excluding the point where those adjacent sides of the parallelogram intersect. Finally, the implied vectors from the root of a triad through at least one arm of that triad points to the root of another triad or solo in the target. A solo is simply a blob that is not part of a triad.

Figure 1:
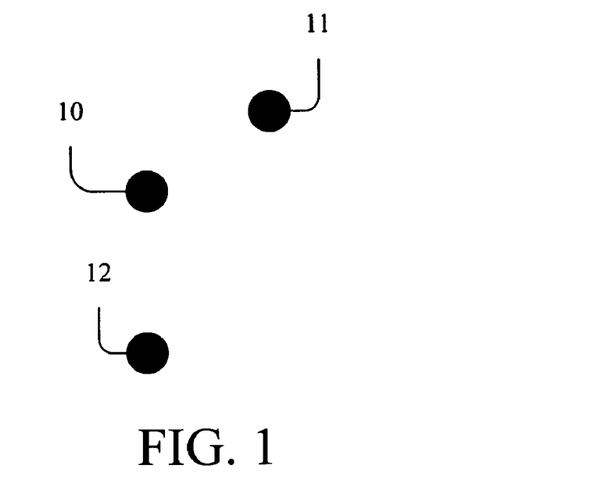
FIG. 1 illustrates a triad according to an embodiment of the invention.

Reference will now be made in detail to an embodiment of the present invention, example of which is illustrated in the accompanying drawings. FIG. 1 illustrates a triad, showing a root 10, a first arm 11, and a second arm 12. It should be clear from the illustration that the arms are at equal distances from the root, that all three blobs are of approximately equal size, and that the blobs are not colinear. It should also be noted that there is no requirement that the angle formed by the arms and the root be ninety degrees or any other particular value.

Figure 2:
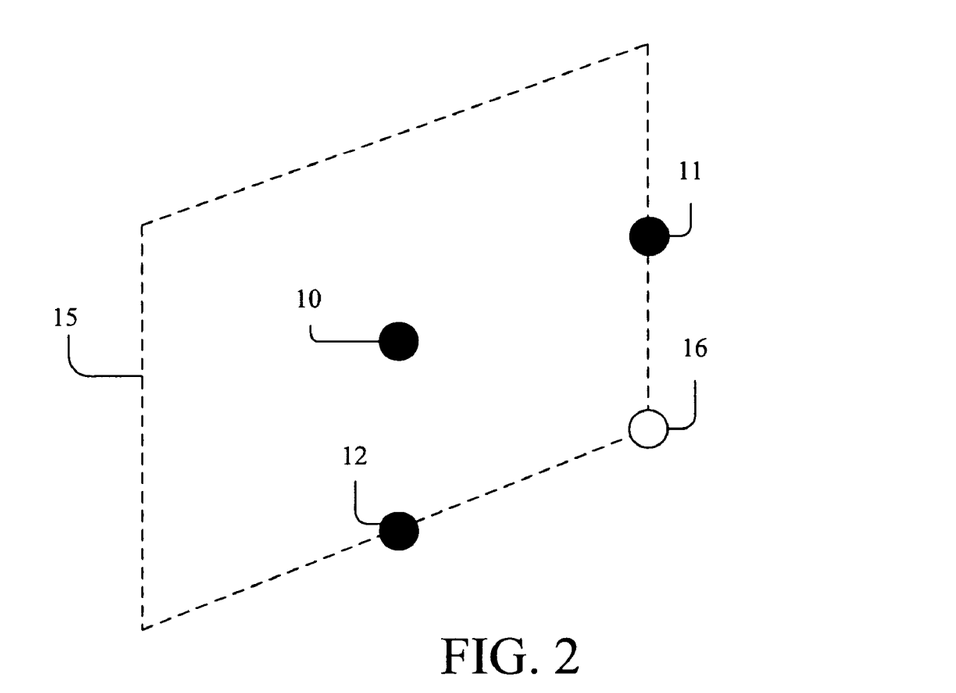
FIG. 2 illustrates a restricted area around a root of a triad according to an embodiment of the invention.

FIG. 2 shows the restricted area around root 10 of the triad illustrated in FIG. 1. The restricted area is a local, parallelogram-shaped area 15 centered on root 10. The size of parallelogram 15 is determined by the location of arms 11 and 12, which, as described above, each lie at the midpoint of adjacent sides of the parallelogram 15. The restricted area excludes the lower right corner point 16 of the parallelogram. The center of a blob may occur at this corner point 16.

The purpose of defining triads is to define a grouping of blobs that is fairly simple to detect, once blobs have been detected in an image. Groupings of blobs with the described characteristics for a triad above are rare in natural scenes and are also uncommon in most artificial scenes unless deliberately designed into the target. It is anticipated that processing of a list of blobs in an image uses easily detected features of each blob, like size and location to find all possible combinations of three blobs which might constitute a triad. Variations to the preferred definition embodiment for a triad are obviously also workable. For example, one or both of the arm blobs could be a different known size relative to the size of the root blob. Also, the definition might allow other blobs within the restricted zone so long as they were not a reasonable size to constitute a root or arm. Alternatively, the size and shape of the restricted zone could be defined differently or additional blobs might be required in or around the required three blobs for the triad, allowing for more convenient implementation dependent computational processes or better rejection of unintended triads. The purpose of the definition is still the same. Triads should be easily detected, well localized features in an image and unintended triads should be relatively rare. This invention recognizes that detection of blobs is easy and quick, blobs have readily available characteristics of location and size, grouping of blobs by the given definition is computationally efficient and results on most images is a list of candidate triads which has relatively few unintended triad candidates.

Further, this invention recognizes a useful additional concept of a "linking vector" defined in terms of triads and solos. A linking vector is the observed colinearity of any two blobs in a triad with another blob, either a solo or a blob from a different triad. Three randomly occurring blobs in an image are rarely colinear. Colinearity of three points is very easy and efficient to detect by simple computation with location coordinates. Colinearity is a preserved property under perspective distortion. Thus, requiring a linking vector relationship between some of all of the triads and solos comprising a finder pattern creates a very efficient selection criteria in a finder pattern search. Clearly, a linking vector could also involve the required colinearity of more than three blobs, and/or alternatively could require the colinearity of three blobs which are each from different solos or triads. The given definition is a preferred embodiment that is intuitive and easily verified by visual inspection in many applications.

Figure 3:
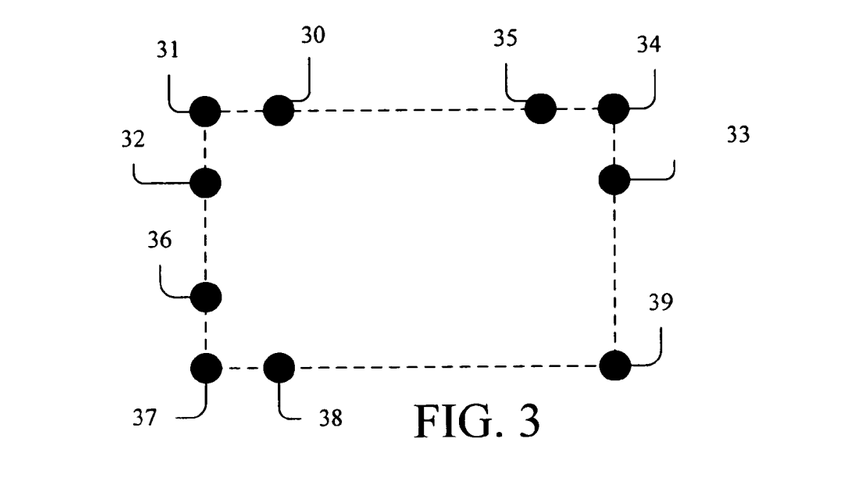
FIG. 3 illustrates an example of a finder pattern according to an aspect of the invention.

FIG. 3 illustrates the implied linking vectors in a simple finder pattern constructed from three triads and one solo. The linking vectors form a simple rectangle. The upper left triad consists of a first arm 30, a root 31, and a second arm 32. The upper right triad consists of a first arm 33, a root 34, and a second arm 35. The lower left triad consists of a first arm 36, a root 37, and a second arm 38. The solo consists of a blob 39, which is not part of any triad. FIG. 3 also shows implied co-linearity links between the three triads and the solo. For example, the upper left triad has an implied co-linearity link to the upper right triad because a vector extending from the upper left triad root 31 through the upper left first arm 30 is co-linear with the upper right root 34. Similarly, the upper right triad is linked back to the upper left triad by the fact that the upper right root 34 and upper right second arm 35 are co-linear with the upper left root 31. The upper right triad is also linked to the solo 39, since the upper right root 34 and the upper right first arm 33 are co-linear with the solo 39. Similarly, the lower left triad is linked to the solo 39 and the upper left triad. This linking makes the finder pattern very quick and easy to detect and identify. A triad grouping can occur in natural scenes and from unintended features in artificial scenes, but is not common. Linked triads are even less common.

Figure 6:
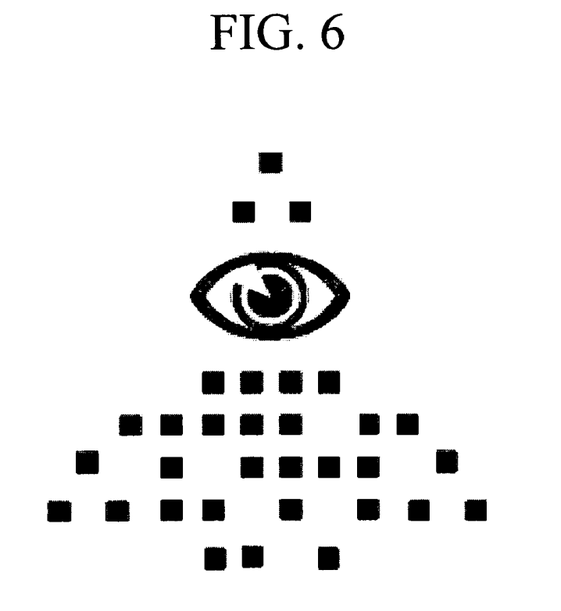
FIG. 6 illustrates an example of a non-rectangular 2D machine readable code according to another aspect of the invention.

FIG. 6 illustrates a more complex finder pattern used to form an angular shape which borders a commercial logo. In analyzing the image to determine blob patterns, it is expected that the logo itself will resolve into one or more unintended blobs. However, it should be obvious that the centers of the blobs created by the logo will be substantially different in area and will be at sufficient distance from the blobs that form the triads of the code so that the triads will still be clearly identifiable using the definition of a triad previously given.

It is anticipated that the areas corresponding to finder pattern blobs in an image will have a range of readily identified characteristics. For example, finder pattern blobs will probably fall in a limited range of acceptable area sizes, and may be known to have some reasonable contour length compared to their area. Such constraints may optionally be imposed on blobs as candidates for forming triads, in order to further filter a list of potential triads found in an image.

Note that the manner in which triads and solos are specified, and thus identified by machine vision software, makes them quite tolerant to common problems with mobile devices. Recognition of triads and solos is very robust under heavy blur, perspective distortion, shadows, background gradients, neighboring non-blob areas (like lines), sensor noise, and other common situations.

In design of a code with finder patterns based on this invention, the triads and solos are placed at known coordinate positions in some suitably chosen frame of reference for the target.

Linking vectors logically link triads and solos together as nodes in what a mathematician would call a directed graph. Requiring some components of a finder pattern to be linked actually makes it easy to match the linked pattern of triads and solos in an image with the linking patterns of known finder patterns by using algorithms for matching directed graphs. However, it is perfectly practical to recognize patterns of triads and solos without any explicit linking vectors. It is simply more computationally efficient to use linking vectors to exclude matching with unintended triads or solos.

Two specific issues can disturb the identification of triad and solo linking in an image, but can be accommodated with obvious adjustments. These issues include curved surfaces and optical distortion in the lens. More specifically, in code design, reducing the distances between triads and solos, and possibly introducing additional elements into a finder pattern mitigate most problems from target surface curvature. Detecting linking vectors always involves a practical error threshold tolerance. In the case of curved surfaces, the colinearity error tolerance is simply set higher.

With respect to optical distortion in a camera lens, barrel distortion, pincushion distortion, and other common fixed camera distortions can be compensated for by adjusting pixel coordinates based on calibration measures to a new set of adjusted pixel coordinates. The description here assumes image locations are already expressed in adjusted pixel coordinates. Vulnerability to camera lens distortions can alternatively, for some cases, be handled by code design adjustments introducing additional finder pattern elements so that the global non-linearity from the distortion can be ignored.

The finder patterns in this invention, as applied to machine readable codes, differ substantially from all known existing finder patterns, and are much more general and flexible than commonly used patterns. In particular, the finder patterns of this invention differ substantially from those used in Snowflake code (U.S. Pat. No. 5,825,015). The finder patterns disclosed herein consist of triads and solos, which are fixed, not variable patterns like those used in Snowflake code. The pattern elements do not have an inherent "two-group" structure as required in Snowflake code. The elements are not required to be placed at "each corner of the machine readable binary code". The elements also do not involve a means "to distinguish each corner from the other by scanning for a second group". In practice, codes generated from the invention will not be visually mistaken for Snowflake or any other codes and those other codes will not visually appear to be part of the family of codes.

Figure 4:
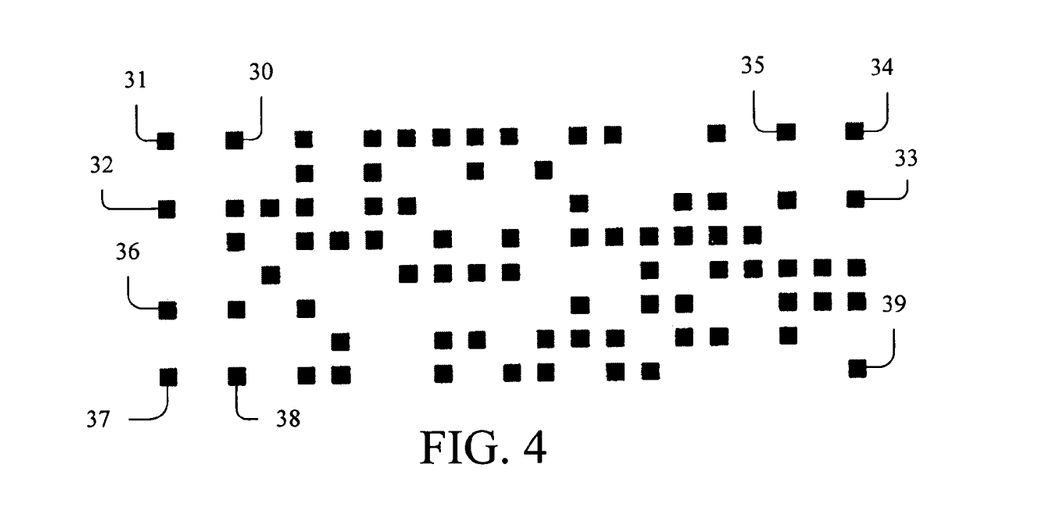
FIG. 4 illustrates an example of a 2D machine readable code according to another aspect of the invention.

An example of a very simple code embodying the finder pattern from FIG. 3 is shown in FIG. 4. There are three triads and one solo that constitute the finder pattern. The roots for the three triads are shown in FIG. 4 as blobs 31, 34, and 37, and the solo is identified by blob 39. In this example, these elements occur at the corners of a rectangular code consisting of a rectangular grid of data elements arranged in a general 8×21 square array. There is no general requirement in this invention that the triads or the solo be placed at the corners of polygon enclosing the data elements, although they are in many preferred embodiments. The only requirements for the finder pattern are that it be constructed of one or more triads and possibly one or more solos, and possibly that the triad and solo elements be linked in some known manner.

The location attributes of elements of a finder pattern exactly define a local two dimensional coordinate reference system on the target and a local two dimensional coordinate system in the image. This allows the mapping between the two coordinate systems to be deduced to a high degree of accuracy. With the coordinate system mapping known, the positions of data elements or any other elements in the image can be deduced from the known data or other element positions in the target. This allows target elements to be placed at arbitrary coordinate locations relative to the finder pattern elements. The implications of this are significant. For application to machine readable codes, it means that data elements are not necessarily restricted to a simple rectangular grid or any other regular geometric pattern, and do not have to occur within an area bounded by the finder pattern elements. The rectangular grid pattern of data elements shown in FIG. 4 is just a particularly simple illustrative embodiment of this invention that continues a common practice of such arrangements. But with the finder patterns of this invention, seemingly random (pre-determined) locations of data elements are quite practical. Randomized locations can have significant benefits such as producing codes which are substantially harder to reverse engineer and which allow substantial obfuscation with ignored elements. Additionally, easy control on placement of data elements allows introduction of graphic elements like logos, lines, shading, and other desired artistic elements anywhere in and around the code.

The coordinate system mapping, which is determined using properties of the finder pattern in an example embodiment, is described below. A natural coordinate system for the machine readable code shown in FIG. 4 might be one with the origin (0,0) at the center of the upper left root 31, the point (20,0) as the center of the upper right root blob 34, the point (0,7) as the center of the lower left root 37, and (20,7) as the center of the solo 39. This coordinate system is particularly simple and obvious because it reflects the fact that the code consists of an 8 by 21 array of blob positions and each blob position can be given a simple integer set of coordinates.

In this simple example, all the blobs are the same size and shape, but this is not a requirement of the invention. Further, it is not a requirement of the invention that the potential blob coordinate positions of finder pattern elements or data elements be simple integer values. Coordinate values can be selected from the full continuous range of real number values.

For the example code in FIG. 4, the full specification for the finder pattern can be defined by a list consisting of the coordinates of each triad's points and the coordinates of the solo. In human readable text form, a complete definition of this finder pattern may be written as:

{0,0; 2,0; 0,2}{20,0; 20,2; 18,0}{0,7; 0,5; 2,7}{20,7}, where each bracketed term fully describes a triad or a solo. The terms with six numbers represent triads, and the term with only two numbers represents a solo. The numbers within the brackets are the coordinates of the blob centers in the selected target reference frame. Using elementary computational geometry or vector algebra, it is simple to deduce from the given coordinates a list of any linking vectors which are present in the specification. This can be done most simply by testing each possible combination of any three blob locations for appropriate colinearity. Thus, it is not necessary to explicitly record the linking information in the finder pattern specification.

It is an object of this invention to enable simple specification of a finder pattern with a very limited set of numerical data. Each finder pattern to be recognized by a machine vision application can be specified by a very concise list of numerical data. Multiple specifications can be stored and maintained internally or externally to the machine vision application, and read and used by application at run time. External specification allows the code recognition application to quickly recognize and locate a number of different possible finder patterns, without requiring program changes when code definitions are added, deleted or changed.

In the case of machine readable codes, the specification can be further augmented to include specification of one or more configurations for the location of all data elements, to make it practical to search for a variety of potential finder patterns and distinct codes with little additional machine computation or increased complexity of code reading program logic.

Figure 7:
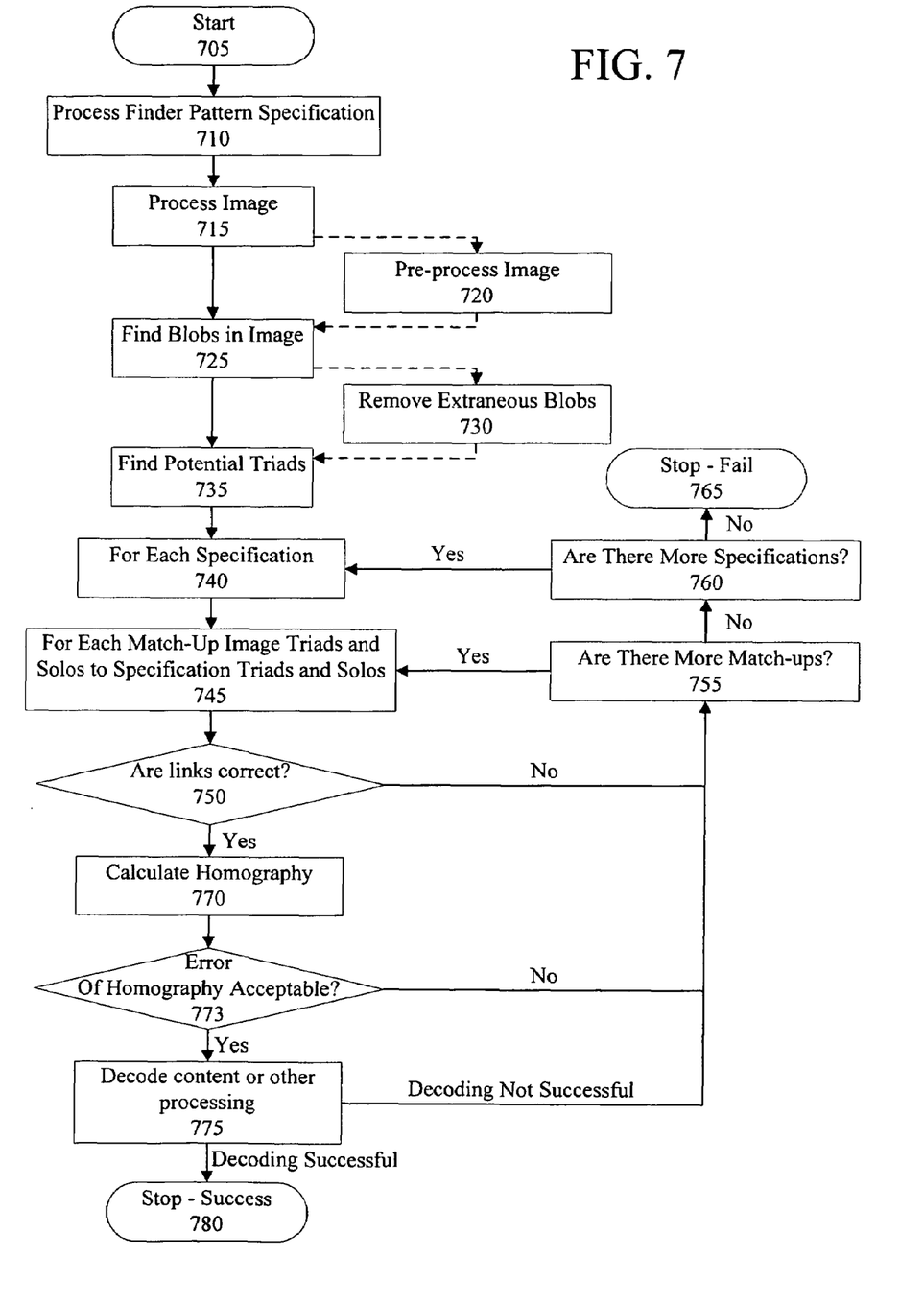
FIG. 7 is a flowchart illustrating an exemplary method of the invention.

Using the example information string above to specify the model of the particular finder pattern found in FIG. 4, the model can be matched against the coordinate blobs of a particular image of that code using the following method, which is illustrated in FIG. 7. After the procedure is started at step 705, a finder pattern specification is processed at step 710. The finder pattern specification may be loaded onto the device prior to this step, or may already be stored on the scanning device, which is a computing device. The finder pattern specification preferably includes a list of ideal reference target coordinates for the blobs in target triads and solos, and enables the creation of a list indicating which triads are linked to which other triads and solos.

After the finder pattern specification is loaded and pre-processed, the image to be scanned is captured at step 715. Capturing may involve retrieving an image from storage, receiving an image via a communication channel, or receiving an image directly from a sensor device. This step may be repeated as necessary until an acceptable image is obtained. At this point, the image may be pre-processed at step 720 to reduce noise, reduce image dimensions, or change pixel information to a more convenient format.

After the image is captured and pre-processed, the scanning device identifies each of the blobs in the image at step 725 by finding areas of the image that correspond to blobs. This blob detection can be done by any one of several different image processing techniques that are well known in the art and readily available in image processing software libraries. The output of this process should include a list of the identified blobs present in the image with information identifying attributes about the blobs, including, for example, the pixel location coordinates of each blob, and a measure of the blob area. In addition, the list formation logic may optionally remove any extraneous blobs at step 730, if desired, based on any suitable filter criteria. For example, blobs may be selectively removed based on their size, their position within the image, their color, or any other measured characteristics.

After the blobs have been identified and filtered, as necessary, the potential triads within the image are identified at step 735. The potential triads should be identified in a list, which is developed, for example, using the following method. For each blob, the two nearest neighboring blobs in the image can be identified. In many applications it is practical to do this simply by exhaustively selecting every possible combination of two blobs, calculating the distance between those blobs, and remembering only the two smallest distances for each blob. Each blob and its two closest blob neighbors thus form a triad candidate pattern with the first blob as its root. Any triad candidate pattern not having all three blobs approximately the same area, having colinear blobs, or not meeting other reasonableness constraints are eliminated as potential triads. In addition, any candidate triad patterns where there exists an additional blob (not one of the two arms) which is within a disallowed area close to the root can be eliminated as a potential triad. In practice, some of this elimination logic can obviously be combined with the logic for finding the two nearest neighbors for each blob.

After the potential triads have been identified, the triads in each finder pattern specification (step 740) are compared to the potential triads in step 745. If there are known linking vectors in the finder pattern design, any suitable algorithm for matching directed graphs may be used for this comparison. For example, a brute force algorithm for matching might comprise the following: for each entry in the finder pattern model, test all permutations of plausible assignments of triad candidate or solo candidate to corresponding triad or solo positions in the reference model, and pruning (step 750) the search when there is a failure to match an implied connection. If no linking vectors are present in the specification, no pruning based on linking is done, but pruning based on other plausible assignment considerations can still be done. Plausible assignments might be judged by relative distances and directions of various elements triad and solo elements, where approximate distance and directions can be judged by ratios to the spacing and orientation of triad roots and arms.

Step 745 will result in one or more sets of corresponding blob coordinates from the image with blob coordinates in the finder pattern specification. For each match-up, it is possible to solve a set of linear equations (step 770) for the unknown parameters of the perspective transform between the target frame of reference and the image frame of reference. It is possible in this step to determine whether the links between the triads and solos are correct (within some error tolerance) and discard mappings with too high an implied error.

If a match-up is pruned, additional match-ups are located in step 755 and/or additional finder pattern specifications are used for the basis of comparison in step 760. If no correct linkages are found using the available finder pattern specifications, and all match-ups have been analyzed, the scanning device concludes that there are no finder patterns in the image, and returns a Stop-Fail in step 765.

However, if it is determined that the homography between identified triads and solos is acceptable in step 773, then the function of the finder pattern is completed, and the device proceeds to step 775. Step 775 may, for example, sense the data content at positions in the image that can now be precisely determined from their design coordinates on the target and the application of the homography to transform them to pixel coordinates in the image. Alternatively, step 775 may try to recognize some picture elements, graphic, icon, or logo, or carry out additional processing steps appropriate to the original machine vision usage. If the decoding or other processing is successful, the scanning device has achieved its purpose and returns a Stop-Success in step 780. If not, the device may continue on to consider other possible match-ups indicating other possible finder pattern types and locations in step 755.

As a specific example of the algorithm above, the calculations for the finder pattern previously specified and simplified data taken from an actual camera image of the code presented in FIG. 4 can be explained.

First, in the specification, all triads pointing to the roots of other triads or solos are identified. This is easily done by considering each triad and testing whether the combination of its root and either arm is colinear with the root of any other triad (or solo). Colinearity testing is well known in computational geometry. Given the coordinates of any three points $(x1,y1)$, $(x2,y2)$, and $(x3,y3)$, a function can be defined as follows:

$$F(x1,y1,x2,y2,x3,y3)=Sq((x2-x1)*(y3-y1)-(x3-x1)*(y2-y1))/(Sq(x3-x1)+Sq(y3-y1))$$

where the function "Sq( )" is simply the square of the enclosed quantity. Conceptually, F( ) measures the distance of the point $(x2,y2)$ from the line formed by $(x1,y1)$ and $(x3,y3)$. This measures the colinearity of the three points. An arbitrary value can be selected (for example, 2) and any three points colinear can be considered if the result of F( ) applied to these three points is less than that threshold. Performing this test on each possible combination of triad-root and arm and other triad-root, the following table of colinear points can be obtained. Note that prior-knowledge about the design of this code is used to limit the linking vectors to on a preferred root-arm-other combination of elements.

TABLE 1

| Point #1 (Root) | Point #2 (Arm) | Point #3 (other Root) |
|---|---|---|
| 1 | 2 | 4 |
| 1 | 3 | 7 |
| 4 | 6 | 1 |
| 4 | 5 | 10 |
| 7 | 8 | 1 |
| 7 | 9 | 10 |

In creating the table entries, an index number is associated with each point in the specification as would be assigned by parsing the specification from left to right and assigning point numbers beginning with "1" (e.g.—point "1" is $(0,0)$, point "2" is $(2,0)$, etc.). So, for instance, the last line of the table says that point "7" (which has coordinates $(0,7)$ and is the root of the third triad) and point "9" (which has coordinates $(2,7)$ and is the second arm of that triad) point to point "10" (the solo at coordinates $(20,7)$).

Next, the image is captured, and may be pre-processed. Simple subsampling or a uniform rectangular interpolating filter is all that typically may be needed, depending on the conditions under which the images are captured and the pixel dimensions of the image. This step may also involve conversion of color image pixel information to grayscale by weighted average of the color components, or selection of color or other attributes designed to enhance the discovery of a particular finder pattern's elements using a priori known characteristics of that particular pattern. For instance, if the blobs were known to be printed in red, it would make sense to select only the red component from an RGB image as the scalar pixel value for further processing.

Then, the image is processed using, for example, a standard image signal processing task, to identify blobs in the image. Most good image processing toolboxes will include a function to find all blobs in an image. One popular commercial software library, the Matrox Imaging Library, provides substantial support for identifying and analyzing blobs in images on many different computing platforms. The product is available, for example, from Matrox Electronic Systems Ltd.,1055 St. Regis Blvd.,Dorval, Quebec H9P2T4 Canada Tel: +1 (514) 685-2630. Standard image process approaches for detecting and calculating the size and location of blobs including binarizing the image by thresholding local grayscale values, region segmentation, region growing, flat fielding, creation of contour boundaries, or edge detection and linking of edges creating closed boundaries around blobs. One good source of source code implementing several algorithms using these approaches is the book which can be adapted to specific project needs is "Practical Algorithms for Image Analysis, Description, Examples, and Code", M. Seul, L O'Gorman, & M. J. Sammon, Cambridge University Press, 40 West 20th Street, New York, N.Y. 10011-4211, 2000 (ISBN 0 521 66065 3).

The data shown below in Table 2 might be a possible output result from applying the image processing steps of the algorithm to a 320×240 pixel photo of the code shown in FIG. 4 for one simple embodiment of the invention.

TABLE 2

| Blob # | X | Y | Area |
|---|---|---|---|
| 0 | 196.5625 | 1.1875 | 5 |
| 1 | 251.3125 | 4.625 | 3 |
| 2 | 281.0625 | 2.6875 | 14 |
| 3 | 316 | 4.375 | 10 |
| 4 | 260.75 | 5.375 | 27 |
| 5 | 270.5 | 8.5 | 2 |
| 6 | 273.75 | 7.75 | 5 |
| 7 | 197 | 11 | 10 |
| 8 | 292 | 30 | 2 |
| 9 | 312.3125 | 32.625 | 3 |
| 10 | 317.3125 | 33.5625 | 12 |
| 11 | 245 | 39 | 2 |
| 12 | 284.5 | 39.5 | 2 |
| 13 | 243 | 69 | 2 |
| 14 | 318.0625 | 72.6875 | 11 |
| 15 | 62.6875 | 74.5625 | 33 |
| 16 | 251.3125 | 76.625 | 3 |
| 17 | 83.0625 | 75.9375 | 28 |
| 18 | 130.9375 | 78.9375 | 35 |
| 19 | 251 | 81 | 2 |
| 20 | 140 | 79.5 | 34 |
| 21 | 175.5625 | 81.75 | 33 |
| 22 | 184 | 82.125 | 35 |
| 23 | 209.5 | 83.6875 | 32 |
| 24 | 225.625 | 84.9375 | 32 |
| 25 | 242 | 85.5625 | 39 |
| 26 | 102.6875 | 82.3125 | 87 |
| 27 | 121.9375 | 83.5 | 79 |
| 28 | 151.9375 | 83.5625 | 106 |
| 29 | 167.25 | 89.6875 | 32 |
| 30 | 61.5625 | 92.5625 | 37 |
| 31 | 130.5625 | 96 | 31 |
| 32 | 226.5625 | 100.5 | 35 |
| 33 | 243.0625 | 101.5 | 34 |
| 34 | 95.3125 | 98.625 | 233 |
| 35 | 121.75 | 100.25 | 68 |
| 36 | 140.3125 | 105.5 | 32 |
| 37 | 313.75 | 89.9375 | 73 |
| 38 | 176.25 | 102.5 | 76 |
| 39 | 217.9375 | 108.1875 | 38 |
| 40 | 91.625 | 112.125 | 28 |
| 41 | 131.625 | 113.4375 | 37 |
| 42 | 146.25 | 114.5625 | 76 |
| 43 | 159.375 | 110.5625 | 74 |
| 44 | 198.75 | 106.6875 | 232 |
| 45 | 59.6875 | 120.375 | 40 |
| 46 | 80.75 | 121 | 29 |
| 47 | 101.25 | 121.6875 | 33 |

TABLE 2-continued

| Blob # | X | Y | Area |
|---|---|---|---|
| 48 | 177.5625 | 123.9375 | 29 |
| 49 | 199 | 124.8125 | 63 |
| 50 | 111.75 | 131.6875 | 32 |
| 51 | 145.75 | 132.125 | 65 |
| 52 | 169.1875 | 133.1875 | 31 |
| 53 | 182.25 | 133 | 74 |
| 54 | 208.625 | 133.5 | 69 |
| 55 | 231.375 | 121.75 | 317 |
| 56 | 80.3125 | 140.3125 | 33 |
| 57 | 102.375 | 140.875 | 40 |
| 58 | 58.5 | 140.1875 | 35 |
| 59 | 111.5 | 140.6875 | 36 |
| 60 | 164.875 | 141.4375 | 82 |
| 61 | 192 | 141.6875 | 66 |
| 62 | 141.25 | 142 | 39 |
| 63 | 248.25 | 142.75 | 34 |
| 64 | 236.125 | 150.25 | 13 |
| 65 | 231 | 169 | 2 |
| 66 | 113.5 | 172 | 2 |
| 67 | 246 | 175 | 2 |
| 68 | 310.5 | 176.5 | 2 |
| 69 | 233.625 | 171.75 | 56 |
| 70 | 305.375 | 182.5625 | 7 |
| 71 | 54.1875 | 169.875 | 440 |
| 72 | 234 | 188 | 2 |
| 73 | 238 | 190 | 2 |
| 74 | 299 | 195 | 2 |
| 75 | 301.5 | 197.5 | 2 |
| 76 | 0.5 | 204 | 2 |
| 77 | 244.3125 | 209 | 3 |
| 78 | 54.625 | 188.5 | 439 |
| 79 | 268 | 216.3125 | 3 |
| 80 | 259.75 | 226 | 4 |
| 81 | 234.4375 | 214.375 | 197 |
| 82 | 248 | 239 | 2 |

The blobs identified are numbered in the left hand column of Table 2 starting with an index of zero simply because this data is taken from a C language implementation of the invention where this is the common convention. The line in the table for Blob #0 says that the algorithm found a blob with center at (196.5625, 1.1875) and a blob area of five pixels.

At this point, extraneous blobs may be removed based on predetermined criteria, or based in their general characteristics. For example, some of the blobs discovered may be too small or too large to reasonably represent blobs associated with the triad and solo points of the target. The reasoning is that, if these were associated with triad or solo points of the target, then the implied scale of the projection of the target onto the image is either too small to be fully and accurately recognized in the image or is too large to fit in its entirety within the image. Clearly, this step is a heuristic that depends on a priori known information about the range of potential physical sizes of targets and the resolution of the image capture device, and must be tailored to the specific conditions expected for the embodiment. Further, it should be very obvious, that this processing can easily be combined with the processing of prior or subsequent steps in the algorithm. However, this is described as a separate step herein simply to clarify that it is an optional step, and may be used in many possible embodiments of the invention while not being used in others, such as where there is good controlled lighting and low noise and high contrast in the image sensor output.

Next, the blobs are analyzed to identify potential triads by determining whether each blob is the root of a triad. This is achieved by finding the nearest neighbors of each blob having similar size or other characteristics, possibly applying heuristics specific to the particular embodiment, such as a priori knowledge that the spacing of the root and arm blobs must be within a specific range relative to a function (e.g.—square root of) the size of the blobs. In the current example, a very simple search technique was used to find the nearest neighbors for each blob. For each blob, all the other blobs were searched, and the two blobs which are closest to the selected blob were selected. Since there are few enough blobs, there will be fewer than a million distance comparisons performed, and this brute force search technique will be practical. Many different techniques are available to make the search substantially more efficient for large numbers of blobs, including Orthogonal Range Searching and Delaunay Triangulation. Explanations of these advanced techniques can be found in many books on Computational Geometry, but are typically not required for most common embodiments The two nearest neighbor blobs identified for each blob are potential candidates to be the arms of a triad where the blob is the root of the triad. One heuristic method to eliminate improbable triads is to reject triads where the distances between the root and the two arms are radically different. Due to perspective distortion, such distances may easily differ, even if they were identical in the original target, but for practical purposes, ratios greater than, for example, 2:1 may be eliminated, since ratios greater than this level would imply very large perspective distortion which would make the image unusable in subsequent steps.

Another heuristic to eliminate unreasonable triads is to eliminate those where the angle formed by the arms and root (with the root at the vertex of the angle) is close to zero or 180 degrees. This can be done easily by calculating the cross product of the vectors formed by the two arms, dividing by the product of the lengths of the arms. The result is an estimate of the Sine of the angle, and candidates can be eliminated where the Sine is close to zero, using some selected numeric threshold near zero for decision making.

Note that finding the two nearest neighbors in this example necessarily implies that there are no other blobs any closer to the root. This is a close approximation of the requirement for defining a triad wherein no other blobs may be located within a parallelogram defined by the root and the two arms, as is described above in more detail. Instead of excluding blobs from a parallelogram defined by the arms and root, it is also generally acceptable to exclude blobs from a circle around the root, with the radius of the circle being the distance of the farthest arm. While this is sufficient for some embodiments, it may also be desirable to search at further distances in specific directions from the root.

The root blob and the two arm blobs also form a local affine coordinate system, with the root being at the origin of the coordinate system, and each arm defining a coordinate axis. Using elementary vector geometry, the image around the root blob in specific directions can be searched for occurrences of other blobs. Alternatively, in the original search for nearest neighbors to the candidate root blob, the third nearest and possibly fourth nearest blob could be identified, and simple vector calculations with the local affine coordinate system described could be used to determine whether these third and fourth blobs fall within the forbidden zone around the potential triad.

Table 3 below shows the output of combining the steps of removing extraneous blobs and identifying potential triads of the current sample, using the results previously shown in Table 2 above.

TABLE 3

| Blob # | X | Y | Area | Nearest1 | Nearest2 | Triad Root? |
|---|---|---|---|---|---|---|
| 0 | 196.5625 | 1.1875 | 5 | 7 | | No |
| 2 | 281.0625 | 2.6875 | 14 | 4 | | No |
| 3 | 316 | 4.375 | 10 | | | No |
| 4 | 260.75 | 5.375 | 27 | 2 | | No |
| 6 | 273.75 | 7.75 | 5 | | | No |
| 7 | 197 | 11 | 10 | 0 | | No |
| 10 | 317.3125 | 33.5625 | 12 | | | No |
| 14 | 318.0625 | 72.6875 | 11 | | | No |
| 15 | 62.6875 | 74.5625 | 33 | 17 | 30 | Yes |
| 17 | 83.0625 | 75.9375 | 28 | 30 | 15 | No |
| 18 | 130.9375 | 78.9375 | 35 | 20 | 31 | No |
| 20 | 140 | 79.5 | 34 | 18 | 27 | No |
| 21 | 175.5625 | 81.75 | 33 | 22 | 29 | No |
| 22 | 184 | 82.125 | 35 | 21 | 29 | No |
| 23 | 209.5 | 83.6875 | 32 | 24 | 32 | No |
| 24 | 225.625 | 84.9375 | 32 | 32 | 23 | No |
| 25 | 242 | 85.5625 | 39 | 33 | 24 | Yes |
| 26 | 102.6875 | 82.3125 | 87 | 27 | 35 | No |
| 27 | 121.9375 | 83.5 | 79 | 20 | 35 | No |
| 28 | 151.9375 | 83.5625 | 106 | 43 | 27 | No |
| 29 | 167.25 | 89.6875 | 32 | 21 | 22 | No |
| 30 | 61.5625 | 92.5625 | 37 | 15 | 17 | No |
| 31 | 130.5625 | 96 | 31 | 18 | 36 | No |
| 32 | 226.5625 | 100.5 | 35 | 39 | 24 | No |
| 33 | 243.0625 | 101.5 | 34 | 32 | 25 | No |
| 34 | 95.3125 | 98.625 | 233 | 28 | 71 | No |
| 35 | 121.75 | 100.25 | 68 | 27 | 41 | No |
| 36 | 140.3125 | 105.5 | 32 | 41 | 31 | No |
| 37 | 313.75 | 89.9375 | 73 | | | No |
| 38 | 176.25 | 102.5 | 76 | 43 | 21 | No |
| 39 | 217.9375 | 108.1875 | 38 | 32 | 24 | No |
| 40 | 91.625 | 112.125 | 28 | 47 | 46 | No |
| 41 | 131.625 | 113.4375 | 37 | 36 | 42 | No |
| 42 | 146.25 | 114.5625 | 76 | 41 | 43 | No |
| 43 | 159.375 | 110.5625 | 74 | 42 | 38 | No |
| 44 | 198.75 | 106.6875 | 232 | 28 | 55 | No |
| 45 | 59.6875 | 120.375 | 40 | 46 | 58 | No |
| 46 | 80.75 | 121 | 29 | 40 | 56 | No |
| 47 | 101.25 | 121.6875 | 33 | 40 | 50 | No |
| 48 | 177.5625 | 123.9375 | 29 | 49 | 52 | No |
| 49 | 199 | 124.8125 | 63 | 54 | 61 | No |
| 50 | 111.75 | 131.6875 | 32 | 59 | 57 | No |
| 51 | 145.75 | 132.125 | 65 | 62 | 42 | No |
| 52 | 169.1875 | 133.1875 | 31 | 51 | 48 | No |
| 53 | 182.25 | 133 | 74 | 49 | 61 | No |
| 54 | 208.625 | 133.5 | 69 | 61 | 49 | No |
| 55 | 231.375 | 121.75 | 317 | 44 | 81 | No |
| 56 | 80.3125 | 140.3125 | 33 | 58 | 46 | No |
| 57 | 102.375 | 140.875 | 40 | 50 | 59 | No |
| 58 | 58.5 | 140.1875 | 35 | 45 | 56 | Yes |
| 59 | 111.5 | 140.6875 | 36 | 57 | 50 | No |
| 60 | 164.875 | 141.4375 | 82 | 51 | 53 | No |
| 61 | 192 | 141.6875 | 66 | 53 | 49 | No |
| 62 | 141.25 | 142 | 39 | 51 | 60 | No |
| 63 | 248.25 | 142.75 | 34 | 69 | 54 | No |
| 64 | 236.125 | 150.25 | 13 | | | No |
| 69 | 233.625 | 171.75 | 56 | 54 | 63 | No |
| 70 | 305.375 | 182.5625 | 7 | | | No |
| 71 | 54.1875 | 169.875 | 440 | 34 | | No |
| 78 | 54.625 | 188.5 | 439 | 34 | | No |
| 80 | 259.75 | 226 | 4 | 79 | | No |
| 81 | 234.4375 | 214.375 | 197 | 44 | 55 | No |

In forming Table 3, all blobs with area less than 4 pixels have been eliminated as root candidates based on their size. In finding the two nearest neighbors of a given root candidate, potential neighbors that are substantially different in size or at unreasonable distances relative to blob size have also been eliminated. This is why some entries show no nearest neighbors or just one nearest neighbor. Such entries are not the root of a triad.

The entries in the columns titled "Nearest1" and "Nearest2" in Table 3 are the blob number index for the arm candidates found. For instance, if blob 15 is considered as a candidate to be the root of a triad, then blobs 17 and 30 (shown as entries in the "Nearest1" and "Nearest2" columns) are the two nearest blobs of similar size and reasonable distance which might be arms of a triad.

There are many root candidates which have reasonable nearest neighbors, but further heuristics like the ones described eliminate all but three of the entries as potential triad roots. In this particular example, the three entries identified do, in fact, represent the roots of the three triads in the example image. In another example, there might have been a few more triad candidates identified, which were the result of image background, noise, shadows, or other sources of spurious results.

Next, after potential triads have been identified, a search is conducted to determine whether the triad candidates and solo candidates correspond to the triads and solos in the original target. The triads and solos should be linked to each other in the image in the same manner that the corresponding triads and solos are linked in the target.

There are many possible algorithms for performing this search. The most obvious algorithm is to use a brute force approach, creating every possible permutation of blobs in the image corresponding to points in the specification, then eliminate cases which don't meet the constraints that certain sets of points form a triad or certain triads point to other triads or solos. Unfortunately, this approach is generally impractical. For example, in the current example case, there are 63 blobs in Table 3, of which 10 are selected to form a permutation corresponding to the 10 points in the target specification. Thus, there are a tremendous, and generally impractical, number of comparisons to make.

Accordingly, a systematic approach is preferred to a brute force approach. For example, the scanning device may select the first blob to correspond with the first target point specification., and then test to see if it meets all known constraints. If it does, mark that blob as "used", and proceed to select another unused blob to correspond to the next target point. If it does not, go on to the next unused blob, and try that one instead. If there is no unused blob remaining that has not been tried, the "backtrack" to the match for the previous target point, unmark the blob used in that match, and go on to consider the next blob in sequence as a possible match. This approach is commonly called a "depth first search". In contrast to the brute-force approach, this approach typically involves substantially fewer possible permutations. This can be seen by the fact that there are only a handful of blobs in Table 3 which are triad root candidates, and that only these will be successfully matched against points in the target which are triad roots. Additionally, the blobs corresponding to triad-arm candidates in the specification are constrained to be the arm candidates for the known root candidates. It is easy to determine which arm candidate corresponds to which arm in the specification (for a given match of roots) by testing the cross product of the vectors formed by the arms with the root. For a proper match, the direction of the cross product vector for the blobs should match the direction of the cross product vector for the corresponding target elements, otherwise the order of the arm matching needs to be reversed. In practice, if the x-y coordinates of the root are (x1,y1) and the coordinates of the arms are (x2,y2) and (x3,y3), the direction of the cross product vector is determined by the plus or minus sign of the expression ((x2−x1)*(y3−y1)−(x3−x1)*(y2−y1)), and it is only necessary to compare the sign of this expression for the candidate blobs with the sign calculated using the target points.

To match the first nine points of the specification which comprise three triads, the correct determination is whether the blob triad root candidates match up with the target triad root points in the specification. There are three blob root candidates, so there are only six ways in which the matching of the first nine target points can be done in the current example. All but one of these attempts at matching will fail because of the colinearity constraints between triads shown in Table 1. The match for the final tenth point of the target can be found by testing all the remaining blobs in Table 3 and checking to make sure that the two colinearity constraints in Table 1 involving the tenth target point are satisfied relative to the blobs previously matched with target points one through nine.

The output of this comparison is shown in the following Table 4:

TABLE 4

| Target Point | Image Blob # | X | Y |
|---|---|---|---|
| 1 | 15 | 62.687500 | 74.562500 |
| 2 | 17 | 83.062500 | 75.937500 |
| 3 | 30 | 61.562500 | 92.562500 |
| 4 | 25 | 242.000000 | 85.562500 |
| 5 | 33 | 243.062500 | 101.500000 |
| 6 | 24 | 225.625000 | 84.937500 |
| 7 | 58 | 58.500000 | 140.187500 |
| 8 | 45 | 59.687500 | 120.375000 |
| 9 | 56 | 80.312500 | 140.312500 |
| 10 | 63 | 248.250000 | 142.750000 |

Table 4 lists all of the image blobs that match the target points. In other cases, it is theoretically possible, although not common in practice to have additional matches returned. In this case, the output must be further tested to determine which match is the desired or correct one.

In image processing, the standard model for a coordinate transform from the target to an image plane is called the pinhole camera model. This model involves a matrix of linear coefficients called the "projective transform matrix" or "homography". The transform matrix requires the use of homogeneous coordinates for the target and image. The homogeneous target coordinates are mapped to homogeneous image coordinates using ordinary matrix multiplication. This transformation is well known and has been extensively studied in machine, vision, projective geometry, and image processing texts for several decades (e.g.—*Algebraic Projective Geometry*, Semple & Kneebone, Oxford University Press, 1952; *Fundamentals of Interactive Computer Graphics*, Foley & Van Dam, Addison Wesley Publishing Company, 1982, Chapters 7 & 8, and *Digital Image Processing* (Second Edition), Gonzalez & Wintz, Addison Wesley Publishing Company, 1987, Chapter 2.)

In addition, there is some discussion in U.S. Pat. No. 6,758,399 on the application of homographies (called "homographs" in that document) to decoding of standard 2D codes. The current application and invention differ substantially from the methods of that invention. For example, according to the present invention, homographies can be calculated without "generating a regular grid" on either the target or image or "generating on said regular grid an undistorted image", as is disclosed by the '399 patent. In addition, the invention clearly allows for and supports creation and decoding of codes that are not organized in a "regular grid" formation. In general, it is not necessary to construct the coordinate systems in any manner or to generate an "undistorted image". A coordinate system is an abstract concept of a consistent way of assigning numbers to positions. Simply determining the matrix entries of the homography that maps from one coordinate system to another is all that's needed.

The use of homogeneous coordinates simplifies the equations of projective geometry into a set of linear equations that can be readily solved by basic linear algebra techniques like Gaussian Elimination. Under the pinhole camera model, when the target is part of a planar (or near-planar) surface, the coordinate mapping from a target to an image is simply ordinary matrix multiplication of the homogeneous target coordinates by a 3×3 matrix (the perspective transform matrix) to yield the corresponding image coordinates. The matrix consists of nine unknown numeric parameters, one of which may be taken to be a completely arbitrary scaling factor inherent in the nature of homogeneous coordinates.

The values of these unknowns can by found by constructing a set of linear equation constraints generated from the known coordinate mapping of any four points (with no more than any two points colinear) from the target to the image. This is the case for the example code where the triads and solos are located at the four corners of a rectangle. The locations centers of the roots of the three triads and the location of the center of the solo can be taken as the four points. For these points, both the image coordinates and the ideal target frame of reference coordinates are known. Given that no set of any three of those points is colinear, the perspective transform matrix will be non-singular, and the set of equations has a well defined solution for the transform matrix elements.

The values of the unknowns can also be found in many other potentially useful design cases, such as where there are five points or more with no more than any three points colinear. This might be the case for a triangular shaped code with triads at the corners of the triangle with additional solo points found along at least two of the triangle sides.

In fact, the values of the unknowns can be found in a code configuration using only two triads. In this case, the positions of the arms as well as the positions of the roots of both triads could be used (defining six points, and assuming there is at least one set of four which is suitably non-colinear) which, in theory, gives a set of six points with sufficient independence for solution of the equations.

In constructing the equations, it is necessary to add arbitrary multiplier unknowns to each of the homogeneous coordinate image vectors to reflect the fact that homogeneous coordinates are only determined only within an arbitrary scaling factor. In the case where exactly four points are used, this results in a set of twelve simultaneous equations with thirteen unknowns. Because of the mathematical properties of equations using homogeneous coordinates, one of the unknowns can be set to any arbitrary non-zero value, allowing solution of all the other unknowns by standard linear algebra techniques.

When the mapping for more than four points is known and the resulting system of linear equations would be over-constrained, the equations can, of course, be solved by a least squares approach described in most linear algebra texts. Situations where the perspective matrix is found to be singular, or where the solution implies an unlikely or unusable mapping (e.g.—high sum of squares error) between the target and the image can be discarded, and no finder pattern is found in this case.

In order to clarify the derivation of the homography, the sample data derived in Table 4 and the specification for that sample will continue to be analyzed herein: {0,0; 2,0; 0,2}{20,0; 20,2; 18,0}{0,7; 0,5; 2,7}{20,7}. Under a pinhole camera model, there is a 3×3 matrix, M, which transforms the homogeneous coordinates of the specification into the homogeneous coordinates of the image. For simplicity of explanation, only the root points and the solo of the example are selected, and the resulting set of deterministic equations is solved. The homogeneous coordinates of the specification are formed by taking their Cartesian coordinate and adding an additional coordinate equal to one. Thus the specification homogeneous coordinates are taken to be:

$$Spec = \begin{pmatrix} 0 & 20 & 0 & 20 \\ 0 & 0 & 7 & 7 \\ 1 & 1 & 1 & 1 \end{pmatrix}$$

The homogeneous coordinates of the image blobs are:

$$Image = \begin{pmatrix} p*62.6875 & q*242 & r*58.5 & s*248.25 \\ p*745725 & q*85.5625 & r*140.188 & s*142.75 \\ p & q & r & s \end{pmatrix}$$

where p, q, r, and s are unknown scaling factors inherent in the nature of homogeneous coordinates.

The homography, M is taken to consist of the unknowns:

$$M = \begin{pmatrix} a & b & c \\ d & e & f \\ g & h & j \end{pmatrix}$$

Thus, the matrix equation Spec=M*Image is obtained. Performing the multiplications and gathering terms, the following set of equations is also obtained:

1. $0=-c+62.6875\ p$
2. $0=-20\ a-c+242\ q$
3. $0=-7\ b-c+58.5\ r$
4. $0=-20\ a-7\ b-c+248.25\ s$
5. $0=-f+74.5625\ p$
6. $0=-20\ d-f+85.5625\ q$
7. $0=-7\ e-f+140.188\ r$
8. $0=-20\ d-7\ e-f+142.75\ s$
9. $0=-j+p$
10. $0=-20\ g-j+q$
11. $0=-7\ h-j+r$
12. $0=-20\ g-7\ h-j+s$

As noted before, due to the nature of homogeneous coordinates, an arbitrarily selected element of M may be specified as any selected value. For this example, assume j=1. Then, the simultaneous linear equations above may be solved by simple algebra (or programmatically by Gaussian Elimination), resulting in:

a=10.7834
b=−1.09927
c=62.6875
d=1.19269
e=8.1743
f=74.5625
g=0.00751137
h=−0.00856497
j=1 which fully specifies the homography M. Note that additional solved values for p, q, r, and s are generally superfluous for the current purposes and are discarded.

After a solution for the parameters in a homography has been derived, further image analysis steps can be completed. For machine readable codes, the positions of data modules can be calculated from the known coordinate positions in the target frame of reference, by simply multiplying the homogeneous coordinates of the target positions by the homography. This produces the homogeneous coordinates of the data module in the image frame of reference. Thus the value of the data modules can be determined, and software can proceed to decode the code.

As an example, using the previous derived value of M, the image location coordinates corresponding to the target coordinates (5,4) can be found. To do this, the target coordinates can be augmented to get the homogeneous coordinates (5,4, 1), then the column vector is multiplied by the derived value for M, giving the homogeneous coordinates of (112.207, 113.223,1.0033) which correspond to the Cartesian image coordinates of (111.839,112.851).

The availability of an estimated perspective transform makes it easy to create codes with data modules at any target coordinate positions other than those positions occupied by triads or solos. There is no requirement that data modules be positioned on a regular matrix grid. There is no requirement that data modules be positioned within any bounding outline—such as within a specific square or rectangular area delimited by the triads and solos. Codes can, in fact, be designed to put data at randomized positions within reasonable range of the triads and solos. Such data module positions must be decided during code design, and can be made known to the code reader software by such simple means as an ordered list of data location coordinates.

It should be obvious that the same finder pattern may be used with several different specifications for data module locations, if there is sufficient error detection inherent in the code to recognize if the data extracted from each set of locations constitutes a valid code.

Figure 5:
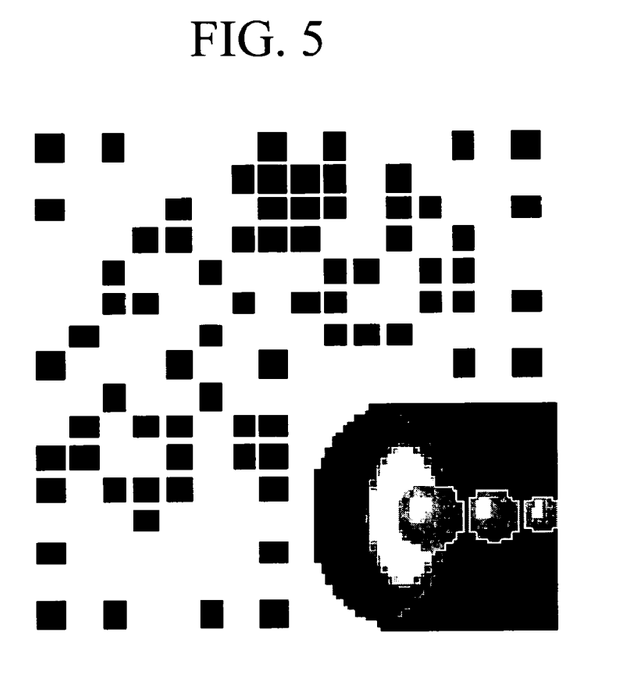
FIG. 5 illustrates an example of a non-rectangular 2D machine readable code according to another aspect of the invention.

One particularly useful application is to add graphical elements in and/or around a code which can serve several purposes. Graphics can help brand the code, or can indicate the intended purpose of a code. Almost any shaped code can be supported by a prudent choice of the positions of triads and solos. For instance, an "L" shaped code might be formed by placing triads at all the convex corners of the "L", and a solo at the concave corner. A logo or icon might then be placed in the upper right area to form a complete visual rectangle bounded on two sides by the "L" code. FIG. 5 clearly illustrates the use of a rotated "L" shaped code.

A more complex example might be the selection of three triads and a solo at various boundary points of an oval, triangular, or other arbitrary shape, with some data module positions lying outside the interior of a polygon formed by the implicit lines connecting the triads and solo. Further, the interior of this polygon might have data module positions specified so as to omit a selected area where a consumer icon is placed. FIG. 6 is one possible example illustrating these concepts. In this illustration, triads are located at the three vertexes of the large triangular shape that constitutes the dominant outline of the square blob elements. It can be seen that an "eye" graphic is positioned within the triangle outline, and some data module elements have been placed outside the triangular outline (below the base of the triangle). Except for the limitation to keep the area around the triads clear of other blobs, there are very few logical restrictions on the artistic creativity which can be practiced in designing machine readable codes using this invention.

The data elements, and possibly the finder pattern elements might be positioned so as to form parts of human recognized symbols, like numbers, letters, words, symbols, or icons.

To differentiate the code from the surrounding print surface, add visual interest, or to indicate the purpose or brand of a code, a code may be created in a defined multitude of colors, patterns, or different module shapes. The code publishing system may systematically define through the use of vector graphics or images, or otherwise defined sectors within the code that have various graphical characteristics. Based on the design requirements, the publishing tools may allow the system user to access, insert or create graphical elements or determinants that define background and foreground characteristics and, colors, and or shading. Further, the system would systematically assure that modules and background had defined differentiated color or gray scale density so that decoding systems will locate modules and accurately register appropriate module values. The publishing system will allow a simultaneous access to a plurality of graphical elements or values that can be opened, saved and retrieved. Codes would then be automatically generated in said defined formats. Individual modules may be printed in a plurality of colors, and shapes as is defined by the publishing system.

The system that is used to publish codes may include an automatic counter that will integrate with billing systems to capture use of various design features and the frequency of use of enhanced services that would have differentiated pricing. The use of premium code features will be associated with various charges depletion of prepaid credits.

The ability to specify an arbitrary number of data element points at arbitrary locations, once the perspective transform is known, allows wide ranging flexibility in the nature of data elements. There is no requirement in this invention that the data elements have any particular graphical appearance. The data elements do not have to consist of blobs. They do not have to be similar in appearance to the finder pattern elements. Data elements can consist of any detectable value determined by the data module coordinates including, for example, a local value of black-white, grayscale or color, any scalar function of the pixel property values in a local area, a local shape or contour, and value properties of local edges or gradients, such as gradient magnitude and direction. At the most flexible, sophisticated level, the specification list for the coordinate location of each data element would also include an additional parameter indicating the encoding convention for the value of the data element at that location.

In addition, the finder pattern element specification can be combined with the data module location and encoding convention lists to form a compact specification to extract all the data bits of a machine readable code based on this invention. Further, adding to this specification a simple data structure describing the interleaving, number of error correction blocks, their sizes, and the parameters of the error correction coding for each block would create a full and complete specification of a machine readable code based on this invention. In practice, some of the elements of a full specification may be implicit assumptions by the decoder. For example, the decoder may assume that the encoding convention for all data modules is a simple binary mapping of light=0 and dark=1. As a further example, the implicit specification of error correction elements may be implied by a simple algorithm known to the decoder, where such algorithm associates a specific error correction scheme with the observed spacing and configuration of the finder pattern elements.

There are infinitely many practical ways to represent such a code format specification. One way, indicated earlier, is as a series of comma separated values in nested sets of parentheses in the style of LISP or Mathematica or other list oriented computer software environments. Another is using a general purpose format like XML which has full nested tree-structure capabilities with data labeling and typing. Of course, such information could also be recorded in specific machine record binary or compressed formats, or recorded as a series of key-linked records in a database.

No matter what representation format is chosen, it is clear that codes based on a finder pattern of this invention can reasonably be expressed in, at most, a few thousand bytes. Such specifications can be external data readable by software performing code scanning. External storage of such information allows external control of which code types are recognized by the software, with minimal effect on software execution times for a moderate number of code types. New codes can be specified and used without any need to modify the existing software.

Such flexibility and maintenance benefits by external specification of code construction are an explicit object and advantage of this invention.

To achieve the basic position and linking objectives, triads have been defined above to consist of three blob elements. In fact, three blobs is merely a minimum requirement. It is recognized in this invention that more than three blobs could be used in designing a triad, with any extra blobs serving a purpose of improving the general ability to distinguish blobs from the target from unintentional triad patterns in a natural scene.

This invention particularly applies to detection and decoding of machine readable 2D code targets from images captured by handheld and mobile devices with local or remote computing support. The invention includes a set of finder pattern elements, a means for their use in machine readable codes, a means for their efficient detection, and a means to specify their configuration in a concise manner to allow easy detector software maintenance and upgrading.

In order to help with clarity of presentation, the invention and background to the invention are primarily described herein in the context of application to machine readable codes. It should be obvious, however, that the finder pattern designs, methods of specification, methods of detection and method of use to derive coordinate mapping between a target object and its corresponding image points are all generally applicable to a wide variety of machine vision problems involving targets on planar or near planar surfaces. Further objects and advantages will become apparent from a consideration of the ensuing description and drawings.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for detecting a finder pattern in a target object, the method comprising the steps of:
   processing an image of a target object;
   identifying six or more blobs in the image;
   identifying two or more potential triads in the image using the six or more identified blobs;
   determining information about one or more characteristics of the two or more potential triads; and
   determining whether the information about the characteristics of two or more of the potential triads corresponds to information about one or more characteristics of two or more target triads in a finder pattern specification, wherein the finder pattern specification includes information about the characteristics of the two or more target triads.

2. The method of claim 1, wherein the information about the characteristics of the two or more target triads in the finder pattern specification includes at least one of positional information about the target triads and information about the visual characteristics of the target triads.

3. The method of claim 1, wherein the information about the characteristics of the two or more potential triads in the finder pattern specification includes at least one of positional information about the potential triads and information about the visual characteristics of the potential triads.

4. The method of claim 1, further comprising a step of sensing the target object prior to the step of processing the image, wherein the step of sensing comprises reading the target object with a sensor.

5. The method of claim 4, wherein the sensor is selected from the group consisting of a scanner, a camera, and a range finder.

6. The method of claim 1, further comprising a step of generating a list of attributes of at least one of the potential triads by performing at least one of a binarization technique, a flat fielding technique, a creation of contour boundaries technique, or an edge detection and linking of edge boundaries around blobs technique.

7. The method of claim 1, further comprising the step of reducing the image noise with a noise reduction filter prior to the step of identifying the six or more blobs in the image.

8. The method of claim 1, further comprising the step of eliminating blobs having one or more attributes that do not meet a predetermined criterion prior to the step of identifying the two or more potential triads.

9. The method of claim 1, further comprising the step of processing the finder pattern specification using a computing device prior to the step of determining whether the information about the characteristics of two or more of the potential triads corresponds to information about one or more characteristics of two or more target triads in the finder pattern specification.

10. A computer readable medium having instructions stored therein for detecting a finder pattern in a target object, which, when executed by a processor of a computing device, cause the computing device to carry out the steps of:
    processing an image of a target object;
    identifying six or more blobs in the image;
    identifying two or more potential triads in the image using the six or more identified blobs;
    determining information about one or more characteristics of the two or more potential triads; and
    determining whether the information about the characteristics of two or more of the potential triads corresponds to information about one or more characteristics of two or more target triads in a finder pattern specification, wherein the finder pattern specification includes information about the characteristics of the two or more target triads.

11. The computer readable medium of claim 10, wherein the information about the characteristics of the two or more target triads in the finder pattern specification includes at least one of positional information about the target triads and information about the visual characteristics of the target triads.

12. The computer readable medium of claim 10, wherein the information about the characteristics of the two or more potential triads in the finder pattern specification includes at least one of positional information about the potential triads and information about the visual characteristics of the potential triads.

13. The computer readable medium of claim 10, further comprising instructions for sensing the target object prior to the step of processing the image, wherein the step of sensing comprises reading the target object with a sensor.

14. The computer readable medium of claim 13, wherein the sensor is selected from the group consisting of a scanner, a camera, and a range finder.

15. The computer readable medium of claim 10, further comprising instructions for generating a list of attributes of at least one of the potential triads by performing at least one of a binarization technique, a flat fielding technique, a creation of contour boundaries technique, or an edge detection and linking of edge boundaries around blobs technique.

16. The computer readable medium of claim 10, further comprising instructions for reducing the image noise with a noise reduction filter prior to the step of identifying the six or more blobs in the image.

17. The computer readable medium of claim 10, further comprising instructions for eliminating blobs having one or more attributes that do not meet a predetermined criterion prior to the step of identifying the two or more potential triads.

18. The computer readable medium of claim 10, further comprising instructions for processing the finder pattern specification using a computing device prior to the step of determining whether the information about the characteristics of two or more of the potential triads corresponds to information about one or more characteristics of two or more target triads in the finder pattern specification.

* * * * *